March 2, 1965 G. F. QUITTNER ETAL 3,172,049
INVERTER APPARATUS
Filed Sept. 12, 1962
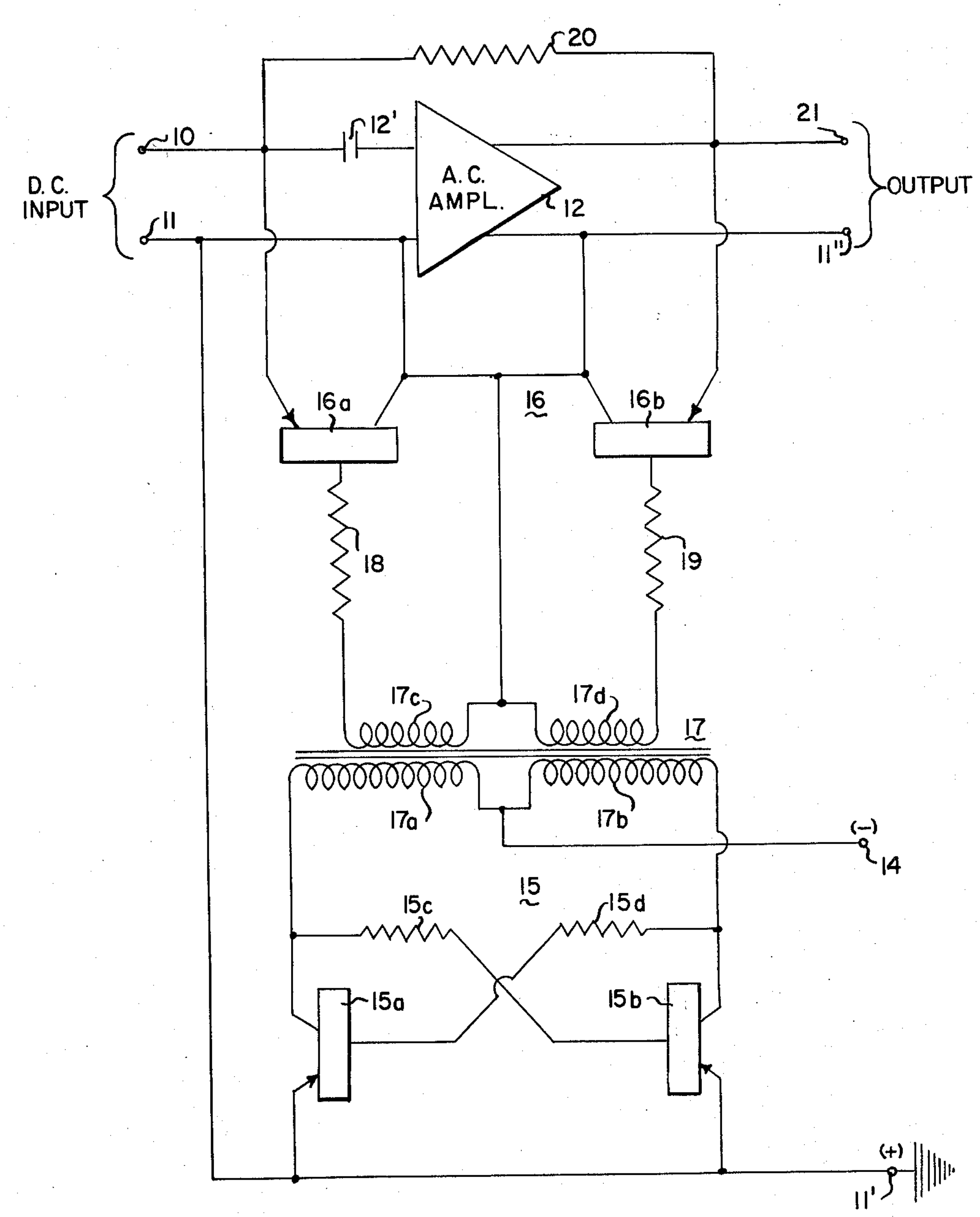
INVENTORS.
GEORGE F. QUITTNER
&
MEHDI HAERI
Richard MacCutcheon
ATTORNEY United States Patent Office 3,172,049

Patented Mar. 2, 1965

3,172,049

INVERTER APPARATUS

George F. Quittner and Mehdi Haeri, Cleveland Heights, Ohio, assignors to Assembly Products, Inc., Chesterland, Ohio, a corporation of Ohio Filed Sept. 12, 1962, Ser. No. 223,067

1 Claim. (Cl. 330—9)

The present invention relates to inverter apparatus and has particular significance in connection with so-called "choppers."

In D.C. amplification art and as the word is used herein, a "chopper" is a device for converting a low voltage D.C. signal to a linearly dependent A.C. equivalent, which can then be amplified by simple, stable RC (or L) coupled amplifiers. In many circuits, the present invention as illustrated being one of them, the outcoming A.C. amplified equivalent is synchronously demodulated by the chopper and negative feedback is heavily applied to improve band width, and range, and linearity.

In the past such choppers have comprised either (1) an electro-mechanical device or (2) electronic circuitry. Mechanical choppers have been disadvantageous because of wear and maintenance difficulties and limited chopper frequencies, and because they require relatively large (and preferably A.C.) driving power. Electronic devices, by comparision, have lower driving power requirements and longer life and are more adaptable to use with any source of driving power, e.g. D.C., but such devices, whether using tubes or transistors, have, in most chopper circuitry heretofore known, had added disadvantages of high first cost and doubtful performance. With transistors particularly there has been poor ratio of "off" to "on" transistor resistance and undesirable changes of "off" and "on" characteristics with temperature change.

It is an object of the present invention to provide simple and inexpensive means for overcoming the above mentioned difficulties.

Another object is to provide a stable, low cost, D.C. energized electronic discharge device or solid state chopper providing large amplifier band width by permitting relatively high frequency of chopper operation.

In accordance with one aspect of the present invention we meet these and other object by providing a low cost square wave excitation generator simply coupled by a transformer to a simple transistor keying circuit. The square wave generator (oscillator) is preferably a multivibrator whose load impedances are furnished by mutual inductive coupling (e.g. by transformer windings) and the arrangement provides advantages of low first cost, insenitivity to temperature change, and insensitivity to supply voltage change.

Other objects and advantages will become apparent and the invention may be better understood from consideration of the following description taken in connection with the accompanying drawing.

The single figure of the drawing is a schematic diagram in which that to which the invention is connected is shown in a simplified form (and it is assumed that a low voltage, e.g. 0–10 millivolt, D.C. signal is applied to line 10 with respect to a common ground 11), and in this drawing figure a preferred embodiment of the invention itself is shown in complete detail.

Assume, for purposes of illustration, that the overall requirement is for low drain battery operation and, to provide stability, it is desired to use an A.C. amplifier as symbolically shown at 12. A chopper circuit is used which in accordance with the present invention is D.C. energized (see the marking at terminals 11′ and 14) and comprises an oscillator (indicated generally at 15), a transistor keying circuit (16), and a transformer (17) coupling the two. As illustrated oscillator 15 is a multivibrator comprising two signal responsive devices, shown as transistors 15*a*, 15*b*, each arranged to be either highly conductive or highly nonconductive a large percentage of the time. The multivibrator is well known in the art, and there are typical cross connections, as shown in the drawing with resistors 15*c*, 15*d*, each connecting a load electrode (e.g. collector, or anode) of one of the signal responsive devices to the controlling electrode (e.g. base, or if it were a tube, the grid) of the other. But the multivibrator shown in the drawing differs from most (or practically all prior art known to us) in that the signal response devices are connected not through so-called load resistances to an arrangement for supplying power but through mutually inductively coupled windings, in the illustrated case "primary" windings 17*a*, 17*b* of transformer 17 which inductively couples these windings with "secondary" windings 17*c*, 17*d* which then (e.g. through resistors 18, 19) alternately bias two transistors 16*a*, 16*b* to respectively short the input to amplifier 12 and then short the output while the amplifier provides itself with heavy "negative" feedback through a resistor 20, the chopper action permitting discharge and charge of a capacitor 12′ in the amplifier input.

In operation, assume that a source of current is connected between terminals 14 and 11′, with polarity as indicated. Because the two multivibrator transistors 15*a* and 15*b* will not have identical conductivities from collector to emitter, somewhat more current will initially flow, for example, through winding 17*a* than 17*b*. As a result, voltage will be induced in winding 17*b* tending to oppose the polarity supplied by terminal 14 with respect to terminal 11′, and this will reduce, more than the initial difference between transistors 15*a* and 15*b*, the flow of current through transistor 15*b*. Thus, the current in transistor 15*a* will rapidly increase and that in transistor 15*b* decrease until essentially transistor 15*a* is "on" (conducting fully) and transistor 15*b* is "off" (conducting negligibly). While this step is proceeding, because windings 17*a* and 17*b* have finite resistance, the potential drop from collector to emitter of "on" transistor 15*a* decreases, while the potential drop across transistor 15*b* has risen. Therefore, current has been flowing through resistor 15*d* into the base of transistor 15*a* to increase its collector to emitter conductivity and more completely switch it "on."

Once this state has been achieved the current briefly ceases to change in windings 17*a* and 17*b*. In a transformer such a steady state condition results in all induction effects ceasing, so that the induced voltage in winding 17*b* which formerly opposed conduction in transistor 15*b* disappears, and, by some small increment, conduction through transistor 15*b* increases. Now the opposite of the previous step quickly occurs; the small increase in current through winding 17*b* produces a voltage opposing the current flowing through winding 17*a* and transistor 15*a*; that change slightly changes the potential of the collector of transistor 15*a* thus slightly increasing the base forward bias of transistor 15*b* via resistor 15*c*. The process continues until transistor 15*b* is fully "on" and transistor 15*a* fully "off." Thus an astable multivibrator operation is achieved, whose conduction currents pass alternately through primary windings (17*a* and 17*b*) of a transformer.

The open circuit voltages appearing in output windings 17*c* and 17*d* are steep sided and peaked, but addition of correctly selected bias resistors 18 and 19 and transistors 16*a* and 16*b* as loads causes desired flattening of waveform peaks. In some cases a capacitor (not shown) may advantageously be connected between the two "outer" transformer secondary winding leads (the two which are not centrally interconnected to the transistor collectors and ground).

The "chopper contacts" are the two transistors 16a and 16b, connected in the common collector mode, which, as is well known, offers maximum input impedance. It is preferred, nevertheless, to select for this service transistors with very high "off" resistance, so that an input resistance during "off" periods of greater than 1 megohm is attained. It is evident from the circuit configuration that the alternating voltage generated in secondary windings 17c and 17d with respect to the central common terminal interconnecting the transistor collectors will alternately bias each switching transistor with "forward" or "on" bias and then with "reverse" or "off" bias.

Although it is not part of our invention, it can be seen that the foregoing circuitry interconnects cooperatively with amplifier 12 and feedback resistor 20 in the following manner: a small D.C. potential is applied between terminals 10, 11 (to be measured or reproduced at the output terminals 21, 11'' in amplified form). Suppose transistor 16a momentarily becomes non-conducting, resulting in a positive pulse entering amplifier 12. By selecting a suitable A.C. amplifier, this results in a positive pulse, greatly amplified, which would appear at the output terminals except that at this time transistor 16b is "on" and effectively shorts together the output terminals. Shortly thereafter transistor 16a is switched "on" producing a negative pulse at the input and output of the amplifier. Since transistor 16b is now "off" this voltage appears across the output terminals, and a fraction of it, governed by the value of resistor 20 and an input resistance (not shown), is applied as "negative feedback" which has the desirable effects of (1) stabilizing accurately the gain of the device, (2) increasing apparent input impedance, and (3) decreasing apparent output impedance.

In operation each of the transistors involved is substantially square wave excited as is very advantageous to produce a high ratio of "off" to "on" circuit resistance as well as substantial independence from temperature change effects. This is so because a transistor achieves its lowest impedance when it is overdriven "off" and its highest impedance when it is overdriven "on" and with square wave excitation it can be, nearly at all times, either overdriven "on" or overdriven "off," and in such overdriven states the transistor is much less temperature responsive than when in the linearly driven state.

It will be apparent to those in the art that an arrangement according to the invention minimizes or obviates inherent transistor shortcomings, permits use of lower cost transistors, and, without sacrificing desired results, permits reducing cost in other ways, e.g. by obviating need of an expensive square loop toroidal transformer requiring many more windings than are required for the transformer with circuitry according to the present invention.

Furthermore, an arrangement according to the invention has proved advantageous in that it permits maximum signal to noise ratio in total circuit, adding very little noise by the electronic chopping possibly because the relatively high driving power is applied with unusual symmetry.

There is thus provided apparatus of the class described capable of meeting the objects referred to. The generator is simple and low cost and has the advantage of being a square wave generator. It is coupled to while (connection-wise) isolated from the simple transistor keying circuit by most efficient means and all of the circuit is relatively insensitive to both supply voltage changes and temperature changes.

The repetition rate of the output is readily adjustable by conventional means, and may, for example, be adjusted over the A.F. range of 15 cps. to 20 kc. The 180° out of phase pulses with very short decay time, depending on rise and fall time of the square waves, implies that the chopper acts as a differentiator.

While we have illustrated and described a particular embodiment various modifications may obviously be made without departing from the true spirit and scope of the invention which we intend to have defined only by the accompanying claim taken with all reasonable equivalents.

By "pair of," "first and second" and words of similar import as used in the claim, we mean to cover both the situation where there are two devices physically separated and the case where the two devices are physically combined but capable of independent control functions as would be true of two halves of a vacuum tube having a single envelope (and even a common cathode), or two halves of a special transistor (even though it may have one common element), or two halves of a center tapped transformer winding.

We claim:

In inverter apparatus of the type converting a D.C. signal to a linearly dependent A.C. equivalent and of the type which employs an A.C. electronic amplifier and a chopper alternately shorting first the amplifier input and then the amplifier output, the novel combination of a multivibrator which has a first and a second controllable electronic device each of said devices having a load circuit and a control circuit, a source of power, a transformer having primary winding means and secondary winding means, an additional pair of controllable electronic devices, first circuit connections connecting transformer primary winding means through the load circuit of the multivibrator first electronic device and with the source of power, second circuit connections connecting transformer primary winding means through the load circuit of the multivibrator second electronic device and with the source of power, multivibrator cross connection means comprising a first cross connection from the load circuit of the multivibrator first electronic device to the control circuit of the multivibrator second electronic device, and comprising a second cross connection from the load circuit of the multivibrator second electronic device to the control circuit of the multivibrator first electronic device, third and fourth circuit connections placing the controls of the controllable electronic devices of said additional pair in push pull arrangement with respect to the transformer secondary winding means, whereby the multivibrator serves to energize the transformer primary winding in alternate fashion, and in predetermined manner the electronic devices of the additional pair operate out of phase with one another to be alternately and alternatively "on" and "off" thus to serve as the said chopper.

References Cited in the file of this patent

UNITED STATES PATENTS

| | | |
|---|---|---|
| 2,970,276 | Dollinger | Jan. 31, 1961 |
| 3,045,426 | Brahm | July 24, 1962 |

OTHER REFERENCES

Electronics publication, pages 54–56, July 24, 1959, "Frequency Control of Magnetic Multivibrators," by Gegger.